Figure 1:
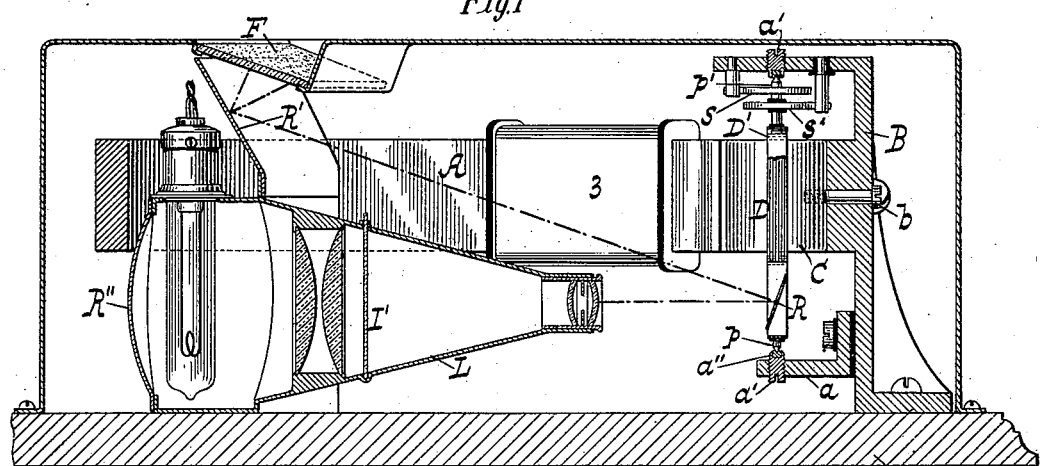

No. 691,393. Patented Jan. 21, 1902.
F. A. LA ROCHE.
ELECTRICAL MEASURING INSTRUMENT.
(Application filed Apr. 20, 1901.)

(No Model.) 2 Sheets—Sheet 1.

Witnesses: Inventor

No. 691,393. Patented Jan. 21, 1902.
F. A. LA ROCHE.
ELECTRICAL MEASURING INSTRUMENT.
(Application filed Apr. 20, 1901.)
(No Model.) 2 Sheets—Sheet 2.
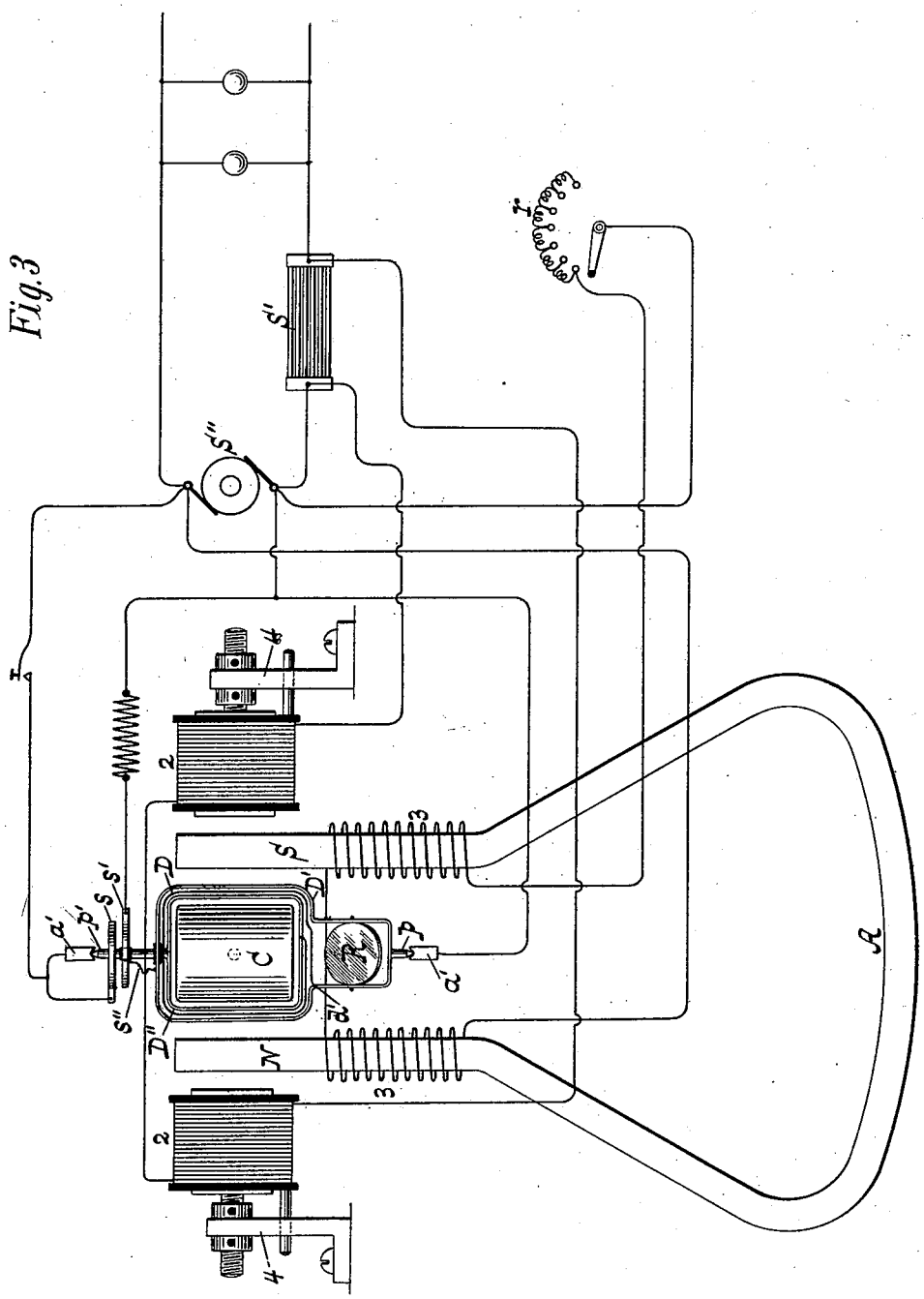
Witnesses: Frederick A La Roche, Inventor
by Philip R. Stern, Att'y

UNITED STATES PATENT OFFICE.

FREDRICK A. LA ROCHE, OF NEW YORK, N. Y., ASSIGNOR OF ONE-HALF TO CHARLES D. COOKE, OF PATERSON, NEW JERSEY.

ELECTRICAL MEASURING INSTRUMENT.

SPECIFICATION forming part of Letters Patent No. 691,393, dated January 21, 1902.

Application filed April 20, 1901. Serial No. 66,731. (No model.)

*To all whom it may concern:*

Be it known that I, FREDRICK A. LA ROCHE, a citizen of the United States, residing at New York city, in the county and State of New York, have invented certain new and useful Improvements in Electrical Measuring Instruments, of which the following is a specification.

My invention relates to electrical measuring instruments of that class employed to measure the current strength and electromotive force of a unidirectional current or the so-called "continuous" current, and relates more particularly to that class in which a pivotally-movable coil is adapted to swing in the magnetic field of a magnet having a constant magnetic value. In electrical measuring instruments of this character it is found in practice that a powerful permanent steel magnet answers the purpose of supplying a strong magnetic field of force, within which the movable system swings when energized by the electrical current to be measured. In using steel magnets, however, for this purpose it has been found in practice that their magnetic intensity is subject to variations and is not permanent after the instrument has been in continued use for some time, and after calibrating the instrument and adjusting it to indicate the value of the current, either expressed as factors of the total energy or in terms expressing the whole of the energy, and allowance being made for a small percentage of error, the variation in its magnetic field introducing new unknown errors renders the instrument useless when any degree of accuracy is required. Again, another source of error in these instruments which has been found to effect their accuracy is due to variations in the restraining effect of the retracting-springs, against which the dynamic coil is caused to work by the action of the electrical current, whereby its value is computed. These retracting-springs should have a constant restraining value for the same values of electromagnetic reaction, since it is the force exerted by the dynamic coil in the magnetic field reacting against the known force required to deflect the retracting-spring which determines the strength of the current in the movable coil. These springs are usually coiled about the shaft of the movable coil or the pivots of the latter in the form of a flat spiral or scroll, and it has been found in practice to be a very convenient method of leading the current in from a terminal of the instrument to a terminal of the coil and from the coil back through another of the springs of similar construction to the other terminal of the instrument. The effect of this is to cause contraction of the spring by the mutual attraction between its convolutions. The effect of this contraction of the restraining-spring has been compensated for by the introduction of another similar spring with its convolutions wound about the axis in the opposite direction. Now the extent to which the mutual attraction between the convolutions of the scroll-wound spring restrains its action, due to its elastic force, depends upon the strength of the current passing through the same and the number of convolutions contained in the scroll or spiral, and for a given temperature at which the instrument was calibrated throughout its whole range no change in the length of the spring would be expected; but as the temperature rises or falls the spring is more or less contracted or expanded, and therefore the number of turns will be increased or diminished by a fraction, and if the two springs are not maintained at a uniform temperature an error will occur in the reading of the instrument, due to the unbalancing of the induction between the convolutions of the two springs.

Another object of my invention is to provide a means whereby this error will be almost entirely eliminated, and in this connection I have contemplated the maintenance of a constant numerical value for the force of mutual attraction between the different convolutions of the flat spiral or scroll by connecting the latter in shunt with the shaft or pivots upon which the movable system swings, so that the total current which is led into the instrument will be divided, one part of it passing through a scroll-wound spring and the other part through the pivots and into the movable coil and in a similar manner out to the other terminal of the instrument. With this manner of connecting the movable coil with the terminals of the instrument a diminution in the strength of the electrical current passing through its spiral-wound spring as its resistance increases with its length and rise of temperature, which will be made to more nearly correspond reciprocally with the variations in the total induction which would take place as the length increased, would compensate for the variations in the contraction of the spring due to temperature, and thus relieve the instrument of the error, all of which will be more fully explained hereinafter.

Another object of my invention is to provide a means for electrical measuring instruments whereby two dimensions of the electrical energy may be computed by but one swinging coil in the magnetic field, thereby reducing the weight and consequently the moment of inertia of the movable system, whereby deadbeat readings may be had more easily than when the movable system has a large coefficient of its moment of inertia.

Still another object of my invention is to provide a magnetic drag or brake which will still further effect the damping or dead-beat swing of the indicator, whereby the reading of the instrument is more easily facilitated than with those instruments in vogue previous to my invention.

All of these objects are characterized by the different features of my invention, as illustrated in the drawings, described in the subject-matter of this specification, and finally pointed out in the claims.

Figure 2:
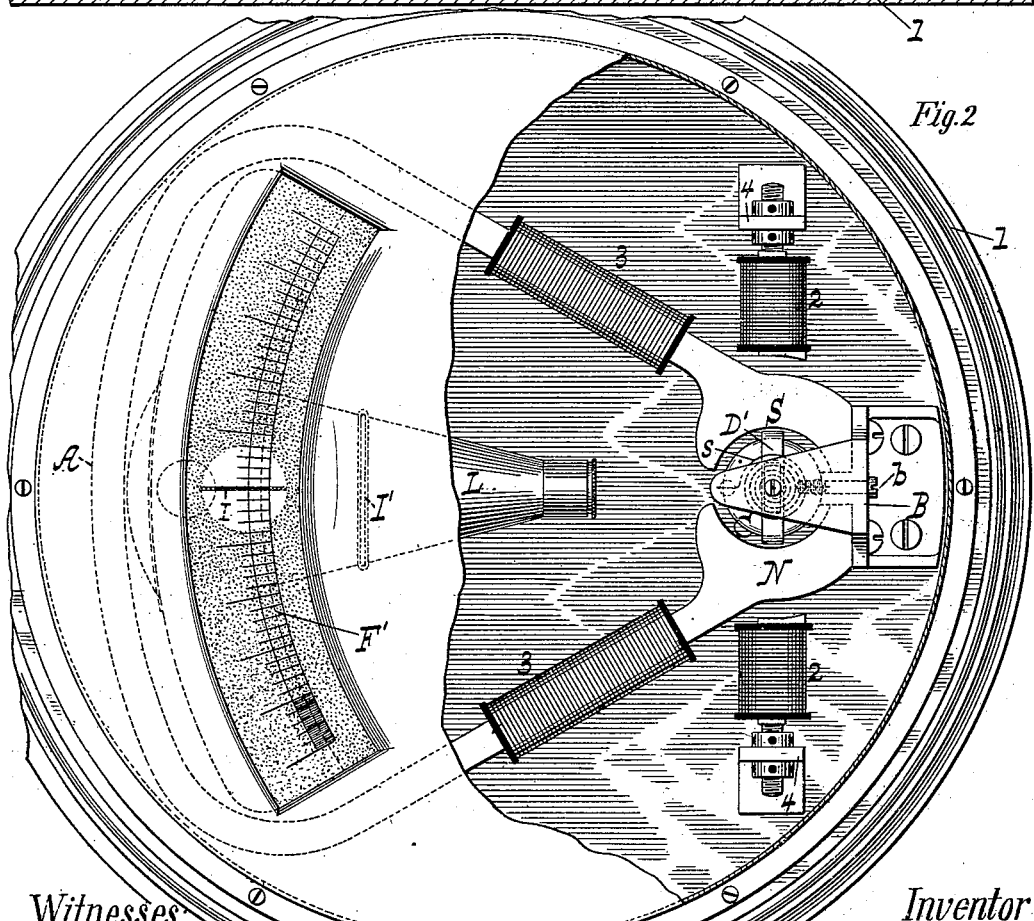

In the drawings, Figure 1 is a sectional elevation of my improved electrical measuring instrument, illustrating the means whereby the angular swing of the movable system is indicated by a beam of light. Fig. 2 is a top plan detailed view of the same, illustrating the means whereby I am enabled to vary the field intensity of the instrument; and Fig. 3 is a diagrammatical view of the same, illustrating the electrical distribution and connections for the different parts of the instrument when connected to a source of electrical current.

In the several figures the same characters of reference relate to similar parts throughout.

The principal parts which constitute the inductive elements of the instrument are the permanent steel magnet A, having the pole-pieces N and S, core C, and a movable coil D. The core C is held rigidly between the pole-pieces N and S, as shown, by a bracket B. The bracket B is secured to the base 1 of the instrument by screws or rivets, as shown, and the core C is held firmly in position in the magnetic field by a screw $b$. The bracket B is also secured to the pole-pieces N and S in a similar manner by screws, as shown. Insulated and secured to the bracket B is an arm $a$, which carries an adjusting bearing-screw $a'$. The bearing-screw $a'$ has a socket, which carries a metallic bearing $a''$, preferably of a non-corrosive dense metal, such as iridium, as a substitute for the usual jewel and forms the lower bearing-seat for the pivot $p$, upon which the movable system swings. The upper bearing-screw is similarly constructed, as shown, and is diametrically oppositely situated, so that the movable system, comprising principally the coil D, magnetic brake D', pivots $p$ and $p'$, reflector R, and retracting-springs $s$ and $s'$, is interposed between the two bearing-screws $a'$ in a manner whereby the said movable system is free to rotate about the pivots $p$ and $p'$ as an axis. The inductor-coil D has one of its terminals electrically connected at $d'$ to the outer hoop or band D', which latter acts as a magnetic brake to retard the action of the coil as it swings in the magnetic field N S. The other end of the inductor-coil D is connected to a supporting-frame D'', upon which the coil D is wound. The pivot $p'$ is secured to the inner frame D'' in electrical contact and, together with the retarding-spring $s$ and the bearing-screw $a'$, forms one of the leading-in terminals for the coil D, while the pivot $p$, bearing-screw $a'$, insulated retracting-spring $s'$, and connecting-wire $a''$, which connects the spring $s'$ electrically with the outer frame D', form when connected by a common conductor, as illustrated in Fig. 3, the other leading-in terminal for the coil D. Thus it will be observed that the current in entering and leaving the inductor-coil D, or, as I shall sometimes term it, the "inductor," is split or divided into two branches, one branch being carried by a retracting-spring and a pivot and its bearing into the coil through one of its frames, and upon entering the coil the current from the two branches being reunited is again branched as it leaves the coil, one of the branches passing out of the coil through another one of its springs, and the other branch, passing out by the other frame through the other pivot and bearing, reunites with the first branch, where it is led, by a common conductor, to the other terminal of the instrument. The electromagnets 2 are situated in close proximity to the pole-pieces N and S of the permanent magnet and are carried by supports 4, secured to the base 1 of the instrument, and are adjustably arranged, so as to enable them to be brought closer to or farther away from the pole-pieces N and S at will, as shown in the drawings, by the nut and screw adjustment. The two electromagnets 2 are connected, as shown, in series and together are connected to the terminals of the usual ammeter-shunt S', so that the fraction of the current which passes through the electromagnets 2, which is equal to the difference of potential between the terminals of the shunt S', (or the electromotive force,) divided by the resistance of the circuit in which the electromagnets 2 are included, as shown in Fig. 3, will by energizing the magnets 2 and 2' increase by induction or decrease the number of lines of force, cutting the inductor-coil D in the magnetic field N S. Thereby the reaction of the magnetic lines of force in the magnetic field N S upon the field intensity of the inductor D will be either increased or diminished, according as the electromagnets are traversed by a current circulating clockwise or counter clockwise. I therefore prefer to term the electromagnets 2 "reaction-magnets" or "reaction-coils," since they react on the fixed magnetic field positively or negatively, according to their own field intensity, and I shall accordingly occasionally refer to them or either of them as such. This variation in the field intensity N S of the permanent magnet A as effected by the strength of the current in the shunt-circuit comprising the electromagnets 2 is a function of the strength of the current passing through the shunt S', and the reaction of the corresponding field intensity N S of the permanent magnet A upon the inductor D when energized, swinging the coil or inductor D, together with the movable system, on its pivots, will measure the strength of the current passing through the shunt S' in terms of amperes, while the inductor-coil D, which is energized by a weak current of constant electromotive force, will indicate by its angular swing the value of such electromotive force in volts in substantially the same manner as the older types of voltmeters of that class to which my invention pertains. To calibrate the instrument as a wattmeter, the magnets 2 2 must be adjusted either toward or away from the poles N and S until the required field intensity at which the inductor D when energized will react, so as to swing at that angle which corresponds to the proper number of watts, is found.

It will be observed that the effect upon the rotatory inductor in the magnetic field N S by both the electromotive force and strength of the current at the source S" is similar to the effect of an armature of a shunt-wound motor, the conditions, however, being reversed—namely, the field is maintained at a constant value, while the electromotive force remains constant; but the armature reaction on the field increases or decreases as the strength of the current traversing the armature-inductors increases or decreases. In this sense the value of the work performed by the rotation of the armature of the electrical motor might be expressed in terms of watts, since two dimensions of the electrical current which is developing the mechanical energy of the motor is computed by the torque of the motor, the speed of the armature being approximately constant, and in the case of the field N S, the intensity of which is varied by a function of the strength of the current through the shunt S', the torque of the inductor D is made variable, thereby the work it is performing when swinging in the magnetic field N S against the retracting force of the springs s and s' will result in a balance of the inductor D by its reaction against the magnetic lines of force of the field N S when it has assumed that angular position in the magnetic field which will just balance the restraining effect of the springs s and s'. This angular swing of the inductor D will then measure the value of the electrical current traversing both the inductor D and the electromagnets 2 2 in terms of watts, and therefore under these conditions the instrument will be a wattmeter. By maintaining a constant field of force of known value between the poles N and S, however, which is accomplished by standardizing the permanent magnet A by the standardizing-coils 3 3, which may be energized for the requisite field intensity by varying the strength of the magnetizing-current by the rheostat r, and disconnecting the electromagnets 2 2, the instrument will measure but one dimension of the electrical current, and therefore may be employed either as a voltmeter or an ammeter. In this latter instance, however, it will readily be understood by those versed in the art that the inductor D is connected with the terminal of the shunt S' in lieu of the coils or field-magnets 2 2.

In order to prevent the racing of the coil D in the magnetic field N S when the former is energized, so as to prevent it from swinging past that angle at which it will be balanced by the magnetic reaction and the counteracting effect of the retarding-springs s and s', I propose to retard its movement, and consequently its momentum, by the magnetic brake D'. For this purpose I prefer to employ a continuous hoop or band of highly-conducting material which will cut the magnetic lines of force as the system swings in the field N S, whereby an induced current will be set up in the conductor D', which will set up a magnetic field opposing that of the magnet A. The principle upon which the reaction is set up in the conductor D' is well known to those versed in the art. The electromotive force of the current set up in the conductor D' or brake, the field N S being constant, depends, then, upon the velocity with which it rotates, and therefore the greater the velocity with which it tends to rotate the greater would be the reaction of its magnetic field on the field N S of the magnet A, thus preventing racing of the movable system to any marked extent beyond its balancing-point in the magnetic field. This "damping" effect, as it is sometimes called, in the swing of the movable system facilitates the reading of the instrument by the indicator, which will be explained hereinafter.

The principle which I employ to indicate the angular movement of the movable system before referred to I carry out by the optical method illustrated in Fig. 1. This consists in a projecting-lantern L, located beneath the permanent magnet A, a plane swinging reflector R, a stationary segmental reflector R', and a graduated translucent screen F, upon which the image of a slide having an index-line is focused by the reflection of the two aforesaid mirrors. The index I is formed by a black line ruled diametrically across the surface of a glass slide I', as is commonly employed in projecting-lanterns upon which a photograph is made for projection, and may readily be introduced in the usual manner into the lantern, or any other desired figure or character may be employed in lieu of the line, or a cross-hair stretched diametrically across the lantern in the plane of projection in lieu of the slide I' may be substituted therefor. To illuminate the slide I' or cross-hair or whatever character it is desired to project upon the scale F' as an index to register with the indices thereof, Fig. 2, I prefer to employ an incandescent electric lamp, as shown, with a reflector R'' located behind it, so as to reflect the rays of light from the lamp onto the condensers of the projecting-lantern in the usual manner. When the incandescent lamp is illuminated, a projection of the index I will be thrown on the translucent scale or screen F by the inclined mirror R onto the segmental inclined reflector R', thence onto the translucent screen F, appearing there as an illuminated circle with a dark line passing diametrically through its center, the axis of the optical ray being indicated by the broken line, as shown in the sectional view, Fig. 1, and the luminous disk with the dark line being represented at I, Fig. 2. In order to adapt the scale F' to the swing of the pivotally-movable system, the indices of said scale are arranged in an arc radial to the pivots $p\ p'$ constituting the axis of rotation of the said system. Upon the angular swing of the movable system carrying the mirror R the latter will be inclined at different angles laterally to the plane of projection and, being a plane mirror, will distort the formation of the luminous disk at different points on the translucent screen F in the path of the arc in which it moves over the said screen. In the intermediate position of the luminous disk I' upon the translucent screen and scale F', as shown in Fig. 2, the illumination will appear in the form of a circle with a black line intersecting it radially with the indications on the screen; but as the movable system swings either to the right or left of that position the luminous spot will become more or less elliptical in form. This distortion in itself will give a rough idea as to the luminous spot on the scale, and therefore an approximate reading of the instrument may be had. The indicator, however, of the instrument intended for taking readings is the dark line which bisects the luminous disk. This, together with the luminous disk, moves over the scale of the instrument as the movable system swings just as the ordinary pointers used in connection with the older forms of instruments and those in vogue at the present time. These pointers, which are employed as indicators, do not permit of accurate reading, for the reason that observations must be made so that the error due to parallax is corrected, whereas no possibility for errors in parallax can occur with the luminous indicator I, for the reason that the subdivided scale and the luminous disk lie in the same plane and exact registration of the dark index-line with the subdivisions on the scale may be made to exactly coincide. This is of a special value where the subdivisions are closely situated.

The lantern L, movable reflector R, stationary reflector R', and indexed screen F, constituting the optical indicator, are arranged so as to lie within the linear limits of the magnet A, as more clearly shown in Fig. 2, and by this disposition of the said parts the instrument is rendered of a very compact form.

I am aware that previous to my invention the readings of electrical measuring instruments have been taken from a screen upon which a beam of light was projected from a small mirror carried by the instrument, so as to illuminate the graduations of the screen corresponding to the angular swing of the mirror. I therefore do not claim this as a part of my invention.

Having fully described my invention, however, I do claim as new and desire to secure by Letters Patent of the United States—

1. A movable system for an electrical measuring instrument, adapted to rotate in a magnetic field upon pivots, when energized by an electrical current, consisting of a magnetic brake, a restrainer, an energizing-coil, conducting-bearings for the pivots, and an indicator for observing the angular movement of the said system; substantially as described.

2. In an electrical measuring instrument, a pivotally-movable system, consisting of a coil having its terminals adapted to be electrically connected with a source of electrical energy and a short-circuited conductor carried by and embracing the said coil, of lower electrical resistance than the resistance of the said coil, and pivots, carried by the said conductor and the coil secured thereon, disposed as an axis of rotation for the said system; substantially as described.

3. In an electrical measuring instrument, a pivotally-movable system having a motor-circuit and a retarding-circuit disposed therein and conductors for the said circuits, and an axially-disposed pivot, carried by each of the said conductors, electrically connected with the terminals of the said motor-circuit and the electrical source; substantially as described.

4. A movable system for an electrical measuring instrument, consisting of an outer and an inner hoop of conducting material, the said inner hoop comprising an electrical circuit having terminals of a higher electrical resistance than said outer hoop, a pivot secured to the said inner hoop, axially, a perforation in the said outer hoop through which said pivot is passed, a second pivot secured to the said outer hoop and in the same axial line as that of the first said pivot, said pivots being connected with the said terminals of the said circuit; substantially as described.

5. A movable coil for an electrical measuring instrument, having pivoted terminals, upon which the said coil swings to conduct a portion of the electrical current to be measured to the terminals of the said coil, retracting-springs, to restrain the said coil against the action of the said electrical current, being also electrically connected with the terminals of said coil, whereby the remainder of the said current to be measured is conducted to the said coil by the said retracting-springs; substantially as described.

6. A pivoted coil for an electrical measuring instrument, having retracting-springs electrically connected with the terminals of the said coil and the source of current to be measured, said retracting-springs being differentially wound and situated within inductive relation to each other, whereby their mutual embracing magnetic lines of force will neutralize their mutual induction effects, bearings for the pivoted coil, also electrically connected with the current to be measured and with the terminals of the said coil through the pivots, whereby the current to be measured is led into the said coil through both the said pivots and the said retracting-springs; substantially as described.

7. In an electrical measuring instrument having a magnetic field of force, wherein a movable coil is adapted to swing, a damping device consisting of an outer hoop of conducting material carried by the coil, a pivot secured to the said hoop and a diametrically oppositely located pivot secured to the said coil, whereby, upon the said coil being energized in the said field of force, the said coil, together with the said hoop, will be set into motion and the said hoop, upon cutting magnetic lines of force in the said field, will restrain the action of the said movable coil by dynamic induction; substantially as described.

8. In an electrical measuring instrument, a pivotally-movable system, having a motor-circuit and a retarding-circuit disposed thereon, and an axially-disposed pivot carried by each of the said circuits, electrically connected with the terminals of the said motor-circuit and the electrical source, said system having a reflector axially secured and adapted to move with the said system; substantially as described.

9. In an electrical measuring instrument, a pivotally-movable system having a motor-circuit and a retarding-circuit disposed thereon and an axially-disposed pivot carried by each of the said circuits, each of the said pivots being disposed in the same axial line and as an axis of rotation of the said system, a reflector carried by the said system and inclined at an angle to the said axis of rotation; substantially as described.

10. In an electrical measuring instrument, a pivotally-movable system, adapted to be energized by an electrical current, comprising a hoop of conducting material, pivots diametrically oppositely arranged in relation to the said hoop as an axis of rotation for the said system, a restraining device, carried by the said system, and an optical indicator for the said system, adapted to indicate the position of the said system by reflection; substantially as described.

11. In an electrical measuring instrument, a pivotally-movable system, adapted to be energized by an electrical current, comprising a hoop of conducting material, pivots diametrically oppositely arranged in relation to the said hoop as an axis of rotation for the said system, a restraining device, carried by the said system and an inclined mirror, carried by the said system, adapted to indicate the angular movement of the said system by reflection; substantially as described.

12. In an electrical measuring instrument, a pivotally-movable system, adapted to be energized by an electrical current, comprising a hoop of conducting material, pivots diametrically oppositely arranged in relation to the said hoop as an axis of rotation for the said system, a spring-retractor to restrain the movement of the said system against the action of the said electrical current, an optical indicator for the said system, whereby the angular movement of the said system is observed by reflected light; substantially as described.

13. In an electrical measuring instrument, a pivotally-movable system, adapted to be energized by an electrical current, comprising a hoop of conducting material, having independent electrical circuits, pivots diametrically oppositely arranged in relation to the said hoop as an axis of rotation for the said system, said pivots having an electrical connection with the said circuits and the said electrical current, a spring-retractor to restrain the movement of the said system against the action of the said electrical energizing-current, and an optical indicator for the said system, whereby the angular movement of the said system is observed by reflected light; substantially as described.

14. In an electrical measuring instrument, a pivotally-movable system, adapted to be energized by an electrical current, comprising a hoop of conducting material, having two independent electrical circuits, pivots diametrically oppositely arranged in relation to the said hoop as an axis of rotation for the said system and as terminals of one of the said circuits, said terminal pivots having an electrical connection with the said electrical energizing-current, a spring-retractor to restrain the movement of the said system against the action of the said electrical energizing-current, and an optical indicator for the said system, whereby the angular movement of the said system is observed by reflected light; substantially as described.

15. A pivotally-supported rotary movable coil for an electrical measuring instrument, adapted to be energized by an electrical current, consisting of a hoop of conducting material subdivided into two electrical circuits, one of the said circuits being short-circuited and of low electrical resistance, the other said circuit being of a higher electrical resistance and having its terminals electrically secured to the said pivots, a spring-retractor electrically connected with the source of the said electrical energy, whereby the latter is in part led into the said high-resistance coil, bearings for the pivots also electrically connected with the said source, whereby the electrical current is led in through both the said pivots and bearings and the said spring-retractor, into the said high-resistance coil, and an optical indicator for the said coil, whereby the angular movement of the same is observed by reflected light; substantially as described.

16. In an electrical measuring instrument, having a magnetic field of force, wherein a pivotally-movable system, consisting of a damping device, comprising an outer hoop of conducting material and an inner energizing-coil, is adapted to swing upon being energized by an electrical current, and an inclined mirror carried by the said outer hoop for indicating, by reflected light, the angular movement of the said system, and a screen to receive the reflected light from the said inclined mirror; substantially as described.

17. An electrical measuring instrument having a magnet, a pivotally-movable system, arranged so as to swing in the magnetic field of the said magnet, and an optical indicator for the said system, comprising a projecting device, a reflector carried by the said pivotally-movable system and a translucent scale arranged in an arc, radial to the axis of the said system and in a plane lying at an angle to the said axis, whereby light from the said projecting device is projected onto the said reflector and thence reflected onto the said translucent scale, so as to indicate the angular movement of the said system; substantially as described.

18. An electrical measuring instrument, having a magnet, a pivotally-movable system arranged so as to swing in the magnetic field of the said magnet, an optical indicator for the said system, comprising a projecting-lantern, a translucent screen with a scale arranged in an arc, radial to the axis of said pivotally-movable system and in a plane lying at an angle to the said axis, a reflector carried by the said movable system for receiving the incident rays of light from the said projecting-lantern and reflecting the same upon the said screen, and an optical index in the path of the said incident rays, adapted to be focused on the said screen by reflection from the said reflector, thereby indicating the angular movement of the said system by the registration of the said optical index with the said scale; substantially as described.

19. An electrical measuring instrument, consisting of a magnet, a pivotally-movable system arranged so as to swing in the magnetic field of the said magnet, an optical indicator for the said system, consisting of a projecting-lantern, a translucent screen having a scale thereon, an inclined reflector carried by the said pivotally-movable system, an optical index, consisting of a cross-line situated in the path of the luminous rays of the said lantern, said lantern being adapted to project an image of the said cross-line and luminous rays upon the said screen by reflection from the said reflector, whereby the said cross-line will divide the luminous plane projected on the said screen, as aforesaid, whereby the angular movement of the said system is indicated by the registration of the said optical index with the aforesaid scale; substantially as described.

20. In an electrical measuring instrument a pivotally-movable coil adapted to swing in a comparatively uniform and constant magnetic field of force, against the force of a restraining device, the coil being adapted to be energized by an electrical current, whereby the value of one dimension of the electrical energy to be measured is computed by the angular swing of the said coil in the said magnetic field of force, and a magnetic reaction-coil, adapted to vary the field intensity of the field of force for the said pivotally-movable coil, whereby, upon energizing the aforesaid magnetic reaction-coil by the energy, or a portion thereof, to be computed, the said pivotally-movable coil will be adapted to swing as aforesaid, in a magnetic field of force of different intensity, whereby the value of two dimensions of the electrical energy to be measured is computed; substantially as described.

21. In an electrical measuring instrument, a pivotally-movable coil adapted to swing in a comparatively uniform and constant magnetic field of force, against the force of a restraining device, the coil being adapted to be energized by an electrical current, whereby the value of one dimension of the electrical energy to be measured is computed by the angular swing of the said coil in the said magnetic field of force, and an adjustable reaction-coil, adapted to vary the field intensity of the field of force for the said pivotally-movable coil, whereby, upon energizing the aforesaid adjustable reaction-coil by the energy, or a portion thereof, to be computed, the said pivotally-movable coil will be adapted to swing, as aforesaid, in a magnetic field of force of different intensity, whereby the value of two dimensions of the electrical energy to be measured is computed; substantially as described.

22. In an electrical measuring instrument wherein a field-magnet is employed to maintain a constant magnetic field of force, a helix for the said magnet adapted, when energized, to vary the field intensity of the said magnet; substantially as described.

23. In an electrical measuring instrument wherein a field-magnet is employed to maintain a constant magnetic field of force, a helix for the said magnet adapted, when energized, to vary the field intensity of the said magnet, and means for varying the strength of the current for energizing the said helix; substantially as described.

24. In an electrical measuring instrument wherein a field-magnet is employed to maintain a constant magnetic field of force, a helix for the said magnet adapted, when energized, to vary the field intensity of the said magnet, and a variable resistance for the said helix, whereby the strength of the energizing-current may be varied at will; substantially as described.

25. A standardizing device for an electrical measuring instrument having a field-magnet, consisting of electrical windings upon the said field-magnet, and a rheostat for the said windings in series therewith; substantially as described.

26. A standardizing-coil for the field-magnet of an electrical measuring instrument having a constant field-magnet and field-magnets of variable intensity, and a rheostat for the said standardizing-coil; substantially as described.

27. An electrical measuring instrument having a permanent field-magnet and electromagnets for varying the magnetic intensity of the said permanent field-magnet, and a magnetizing-coil wound upon the said permanent field-magnet; substantially as described.

28. In an electrical measuring instrument wherein a permanent magnet is employed to furnish a uniform and constant magnetic field of force, an adjustable reaction-coil inductively disposed with respect to the said permanent magnet, for varying the magnetic intensity of the said permanent magnet; substantially as described.

29. In an electrical measuring instrument wherein a permanent magnet is employed to furnish a uniform and constant field of force for the movable system of the said instrument, an adjustable reaction-coil inductively disposed with respect to the said permanent magnet for varying the magnetic intensity of the said permanent magnet, and a standardizing-coil wound upon the said permanent magnet, for readjusting the strength of the magnetic field of the said permanent magnet; substantially as described.

30. In an electrical measuring instrument, a field-magnet having a standardizing-coil wound thereon, and means for uninterruptedly and gradually applying the energizing-current and discontinuing the same; substantially as described.

31. An electrical measuring instrument, adapted to measure the electrical energy in terms of watts, consisting of a pivotally-movable coil, a permanent magnetic field therefor, and a stationary coil for varying the field intensity of the said permanent magnetic field; substantially as described.

32. A wattmeter, consisting of a permanent magnet, a pivotally-movable coil, comprising a single electrical circuit, adapted to swing between the poles of the said permanent magnet, a retracting device for restraining the action of the said coil, and means for varying the magnetic intensity of the said permanent magnet; substantially as described.

33. In an electrical measuring instrument having a fixed field-of-force coil, a pivotally-movable coil and reaction-springs for the said movable coil, an index for denoting the angular movement of the said coil, comprising a translucent scale arranged in an arc, radial to the axis of the said coil and in a plane lying at an angle to the said axis, and a luminous indicator, coöperating with the said coil, adapted to illuminate the indices of the said scale correspondingly to the angular movement of the said coil; substantially as described.

34. In an electrical measuring instrument wherein a coil, energized by a suitable electrical current, is adapted to swing in the magnetic field of a magnet, an optical system adapted to indicate the angular movement of the said coil, comprising a projecting-lantern, a reflector moving with the said coil, located in and inclined to the optical axis of the said projecting-lantern, a stationary reflector adapted to receive and reflect the rays from the said movable inclined reflector, and a translucent indexed screen with a scale arranged in an arc, radial to the axis of the said coil, and in a plane lying at an angle to the said axis for the reception of the rays from the said stationary reflector; substantially as described.

35. In an electrical measuring instrument having a permanent magnet and a pivoted coil adapted to swing in the magnetic field thereof, an optical system, lying within the linear limits of the said magnet, for indicating the angular movement of the said coil, the said system consisting of a projecting-lantern, a reflector, moving with the said coil, located in and inclined to the optical axis of the said lantern, a stationary inclined reflector for receiving the rays from said movable reflector, and a translucent indexed screen for receiving the rays from the said stationary reflector, the said indexed screen having its scale arranged in an arc, radial to the axis of the said coil, and in a plane lying at an angle to the said axis; substantially as described.

In testimony whereof I have signed my name to this specification in the presence of two subscribing witnesses.

FREDRICK A. LA ROCHE.

Witnesses:
G. M. MacWilliam,
P. J. Shelley.